US010777009B2

(12) United States Patent
Martin et al.

(10) Patent No.: US 10,777,009 B2
(45) Date of Patent: Sep. 15, 2020

(54) DYNAMICALLY FORMING AN IMMERSIVE AUGMENTED REALITY EXPERIENCE THROUGH COLLABORATION BETWEEN A CONSUMER AND A REMOTE AGENT

(71) Applicants: Margaret A. Martin, Atlanta, GA (US); Alex S. Hill, Charleston, SC (US); Harrison D. Leach, Atlanta, GA (US)

(72) Inventors: Margaret A. Martin, Atlanta, GA (US); Alex S. Hill, Charleston, SC (US); Harrison D. Leach, Atlanta, GA (US)

(73) Assignee: CN2, Inc., Atlanta, GA (US)

( * ) Notice: Subject to any disclaimer, the term of this patent is extended or adjusted under 35 U.S.C. 154(b) by 0 days.

(21) Appl. No.: 15/898,612

(22) Filed: Feb. 18, 2018

(65) Prior Publication Data
US 2019/0259206 A1 Aug. 22, 2019

(51) Int. Cl.
*G06T 19/00* (2011.01)
*G06F 9/54* (2006.01)
*H04L 29/08* (2006.01)
*H04L 29/06* (2006.01)

(52) U.S. Cl.
CPC .......... *G06T 19/006* (2013.01); *G06F 9/547* (2013.01); *H04L 67/2842* (2013.01); *H04L 67/38* (2013.01)

(58) Field of Classification Search
CPC combination set(s) only.
See application file for complete search history.

(56) References Cited

U.S. PATENT DOCUMENTS

| 6,937,255 | B2* | 8/2005 | Fukuda ................. H04N 5/265 345/633 |
| 8,914,472 | B1* | 12/2014 | Lee ................... H04L 29/06476 709/219 |
| 9,058,764 | B1* | 6/2015 | Persson .................... G09G 5/14 |
| 9,164,577 | B2* | 10/2015 | Tapley .................... G06F 3/011 |
| 9,600,935 | B2* | 3/2017 | Cohen .................... A63F 13/10 |
| 9,762,851 | B1* | 9/2017 | Baumert ............ G06K 9/00711 |
| 9,883,110 | B2 | 1/2018 | Martin et al. |
| 2004/0046711 | A1* | 3/2004 | Triebfuerst .......... G05B 19/409 345/8 |
| 2007/0273644 | A1* | 11/2007 | Mondine Natucci ....................... G06T 19/006 345/156 |

(Continued)

OTHER PUBLICATIONS

Gauglitz et al., In Touch with the Remote World: Remote Collaboration with Augmented Reality Drawings and Virtual Navigation, 2014, ACM, pp. 197-205 (Year: 2014).*

*Primary Examiner* — Motilewa Good Johnson
(74) *Attorney, Agent, or Firm* — H. Brock Kolls

(57) ABSTRACT

The present invention relates to a system and method of placing augmented reality renderings, within the context of physical space imagery, creating an immersive augmented reality experience. The method comprising the steps of imaging physical space, by way of a camera enabled mobile device, to create a physical space imagery, initiating data communication with a remote agent, selecting, by way of the remote agent, at least one of an augmented reality rendering, and data communicating the augmented reality rendering, for inclusion within the physical space imagery, forming an immersive augmented reality experience, viewable and useable, by a consumer, on the camera enabled mobile device.

24 Claims, 5 Drawing Sheets

(56) References Cited

U.S. PATENT DOCUMENTS

| | | | |
|---|---|---|---|
| 2010/0208033 A1* | 8/2010 | Edge | G06F 3/012 |
| | | | 348/46 |
| 2011/0115816 A1* | 5/2011 | Brackney | G06Q 10/06 |
| | | | 345/629 |
| 2011/0164163 A1* | 7/2011 | Bilbrey | G06F 1/1694 |
| | | | 348/333.01 |
| 2011/0212717 A1* | 9/2011 | Rhoads | G06K 9/00664 |
| | | | 455/420 |
| 2012/0099000 A1* | 4/2012 | Kim | H04N 1/3871 |
| | | | 348/231.99 |
| 2012/0154633 A1* | 6/2012 | Rodriguez | H04M 1/72569 |
| | | | 348/231.99 |
| 2012/0195464 A1* | 8/2012 | Ahn | G06Q 30/02 |
| | | | 382/103 |
| 2012/0208592 A1* | 8/2012 | Davis | H04W 4/50 |
| | | | 455/556.1 |
| 2013/0321245 A1* | 12/2013 | Harper | G06F 3/147 |
| | | | 345/7 |
| 2014/0080428 A1* | 3/2014 | Rhoads | H04W 4/70 |
| | | | 455/88 |
| 2014/0267409 A1* | 9/2014 | Fein | G06T 11/00 |
| | | | 345/633 |
| 2016/0049004 A1* | 2/2016 | Mullins | G06T 19/006 |
| | | | 345/419 |
| 2016/0140868 A1* | 5/2016 | Lovett | G09B 19/0053 |
| | | | 434/118 |
| 2016/0148433 A1* | 5/2016 | Petrovskaya | G06T 19/006 |
| | | | 345/633 |
| 2016/0328883 A1* | 11/2016 | Parfenov | G06F 3/0482 |
| 2016/0330380 A1* | 11/2016 | Martin | G06F 3/011 |
| 2016/0358383 A1* | 12/2016 | Gauglitz | G06T 19/006 |

* cited by examiner

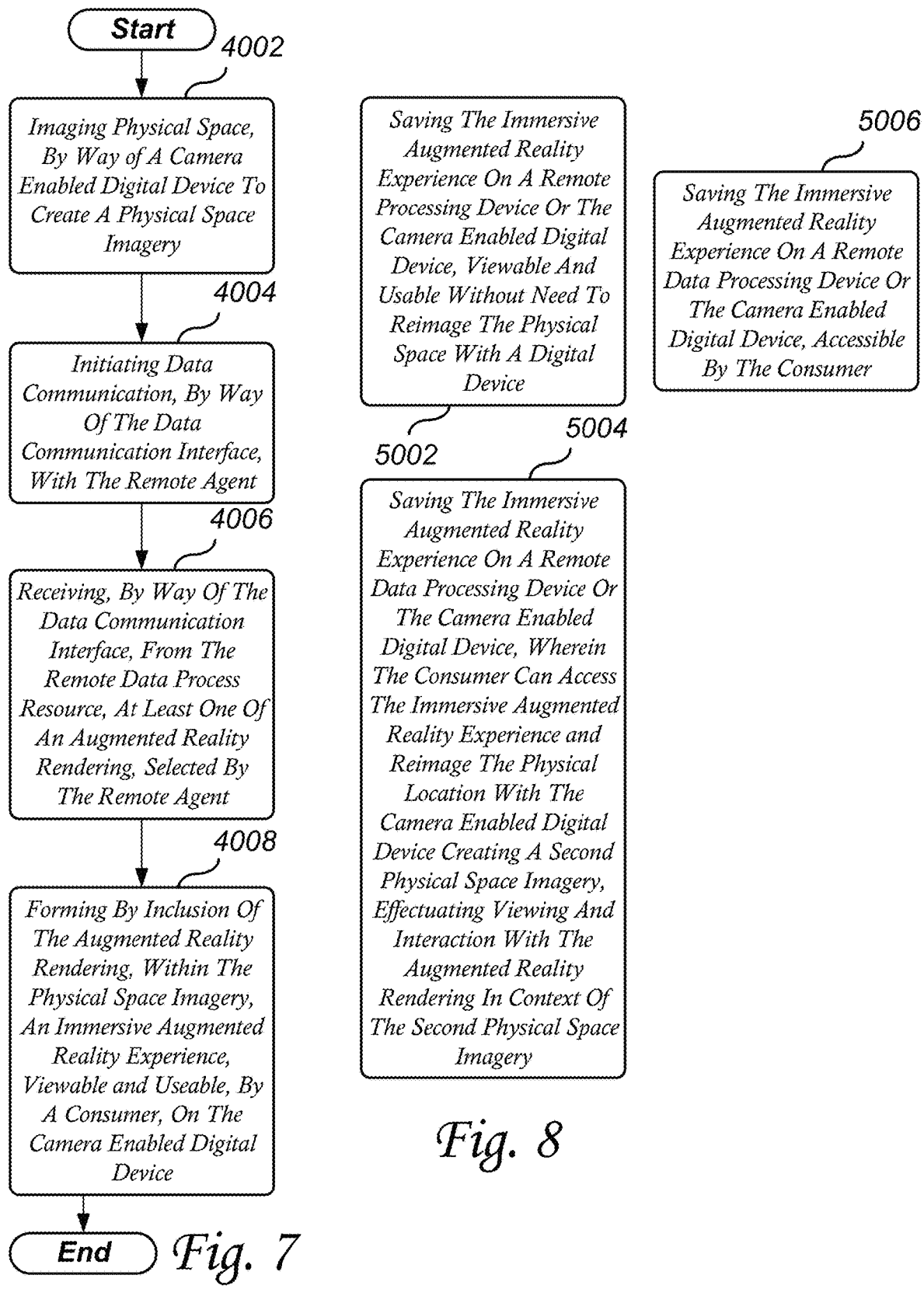

DYNAMICALLY FORMING AN IMMERSIVE AUGMENTED REALITY EXPERIENCE THROUGH COLLABORATION BETWEEN A CONSUMER AND A REMOTE AGENT

TECHNICAL FIELD OF THE INVENTION

The invention relates to a system and method of placing augmented reality renderings, within the context of physical space imagery, creating an immersive augmented reality experience. The method comprising the steps of imaging physical space, by way of a camera enabled mobile device, to create a physical space imagery, initiating data communication with a remote agent, selecting, by way of the remote agent, at least one of an augmented reality rendering, and data communicating the augmented reality rendering, for inclusion within the physical space imagery, forming an immersive augmented reality experience, viewable and useable, by a consumer, on the camera enabled mobile device.

BACKGROUND OF THE INVENTION

Before our invention many augmented reality applications required that the augmented reality renderings be compiled into the software application and downloaded onto the user's device. This created large size applications and forced the consumer to download all the variations of renderings regardless if they were all needed by the user. Additionally, any time the renderings were updated it would require that the user download an updated version of the application. In applications where there were many renderings, trying to store all the variations in a single application often became impractical and could therefore limit the ingenuity of the application designers to trade functionality for trying to accommodate reduced application size limitations.

Other shortcomings included the inability to be able to collaborate with a remote agent so that the needs of the user could be understood and influence the operation of the application for the user's purpose. That is, understand of what the user needed, then tailor the augmented reality application to best suit the user's needs. As a result, often augmented reality applications became confusing to the user and/or did not meet the expectation, or needs of the user. This could lead to the user becoming disenfranchised with the application.

Another shortcoming can be the ability to dynamically form a customized augmented reality application and then save it for future access. In this regard, once an application is working to the user's liking, the ability to save the application, combining both the augmented reality renderings and the physical space imagery would be nice and enable the application to be shared and relied upon, at a later time, making it more useful to the user and those who may be working with the user, such as sales personal, contractors, decorators, repair personnel, and others.

For these reasons and shortcomings, as well as, for other reasons and shortcomings there is a long felt need for a user to be able to collaborate differently with a remote agent and have the remote agent assist in the selection of augmented reality renderings that can be placed, within the context of physical space imagery, creating a customized immersive augmented reality experiences that gives rise to the present invention.

SUMMARY OF THE INVENTION

The shortcomings of the prior art are overcome and additional advantages are provided through the provision of a method of placing augmented reality renderings, within the context of physical space imagery, creating an immersive augmented reality experience. The method comprising the steps of imaging physical space, by way of a camera enabled mobile device, to create a physical space imagery, initiating data communication with a remote agent, selecting, by way of the remote agent, at least one of an augmented reality rendering, and data communicating the augmented reality rendering, for inclusion within the physical space imagery, forming an immersive augmented reality experience, viewable and useable, by a consumer, on the camera enabled mobile device.

Additional shortcomings of the prior art are overcome and additional advantages are provided through the provision of a system for placing augmented reality renderings, within the context of physical space imagery, creating an immersive augmented reality experience. The system comprising a camera enabled mobile device. The camera enabled mobile device further comprising a camera, a display, a user interface, a data communication interface, a microprocessor readable memory; and a microprocessor. The camera, the display, the user interface, and the microprocessor readable memory are operationally coupled with the microprocessor.

The microprocessor readable memory is encoded with instructions that when executed perform the steps of imaging physical space, by way of the camera, to create a physical space imagery, initiating data communication, by way of the data communication interface, with a remote agent, receiving, by way of the data communication interface, from a remote data processing resource, at least one of an augmented reality rendering, selected by the remote agent, and forming by inclusion of the augmented reality rendering, within the physical space imagery, an immersive augmented reality experience, viewable and useable, by a consumer, on the camera enabled mobile device.

Additional shortcomings of the prior art are overcome and additional advantages are provided through the provision of a method of placing augmented reality renderings, within the context of physical space imagery, creating an immersive augmented reality experience.

The method comprising the steps of initiating data communication between a remote agent and a consumer, selecting, by way of the remote agent, at least one of an augmented reality rendering, data communicating the augmented reality rendering, for inclusion within a physical space imagery, of a physical space, generated by the consumer, by way of, a camera enabled mobile device, forming an immersive augmented reality experience, viewable and useable, by the consumer, on the camera enabled mobile device.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 illustrates one example of a system and method of placing augmented reality renderings, within the context of physical space imagery, creating an immersive augmented reality experience; and FIG. 8 illustrates one example of exemplary embodiments of a method of placing augmented reality renderings, within the context of physical space imagery, creating an immersive augmented reality experience.

The detailed description explains the preferred embodiments of the invention, together with advantages and features, by way of example with reference to the drawings.

DETAILED DESCRIPTION OF THE INVENTION

Figure 1:
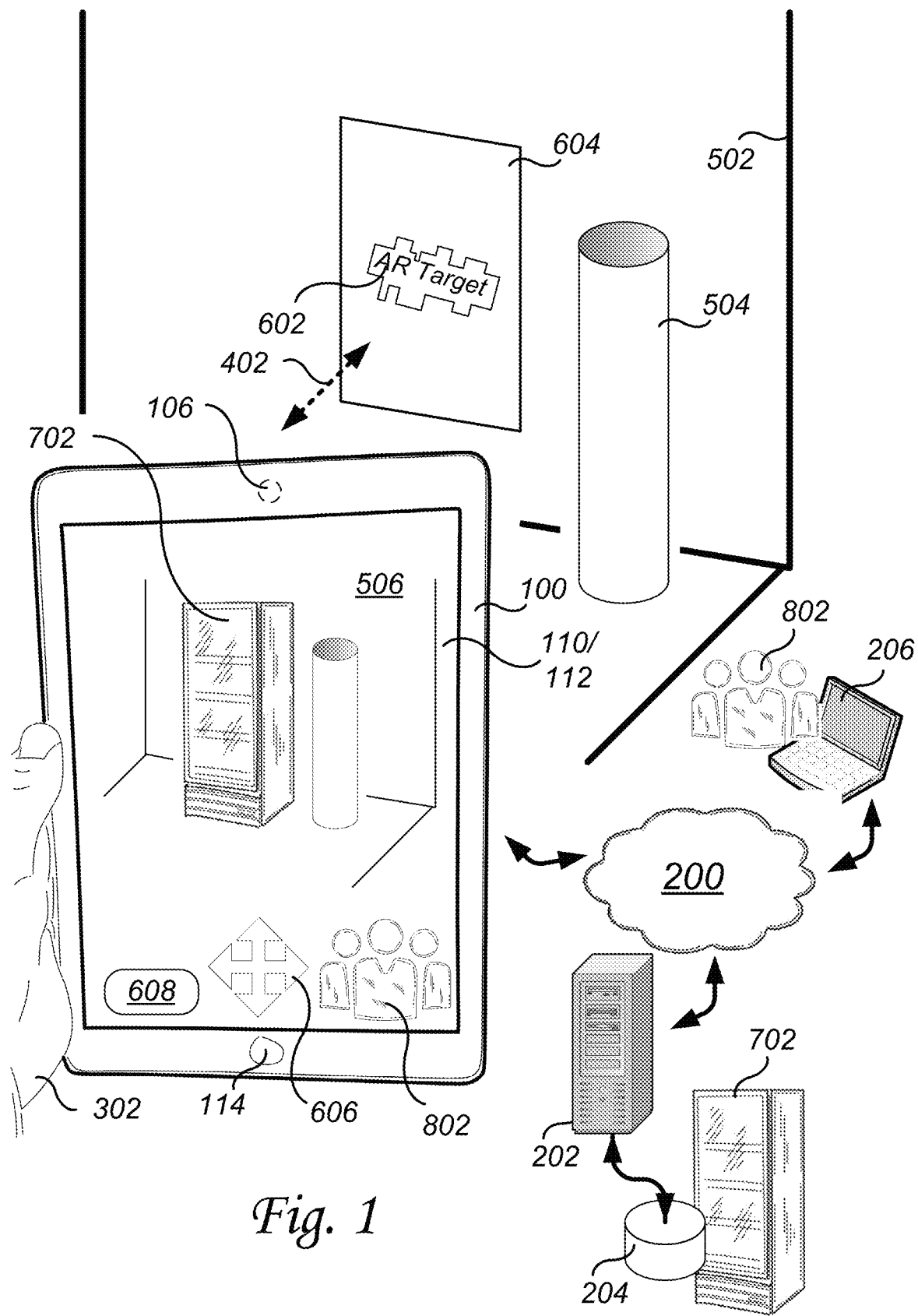
FIG. 1 illustrates one example of a system for placing augmented reality renderings, within the context of physical space imagery, creating an immersive augmented reality experience for a consumer.

Turning now to the drawings in greater detail, it will be seen that in FIG. 1 there is illustrated one example of a system for placing augmented reality renderings 702, within the context of physical space imagery 506, creating an immersive augmented reality experience for a consumer 302. In an exemplary embodiment, a consumer 302 using a camera enabled mobile device 100 can image a physical space 502, creating physical space imagery 506. The physical space imagery 506 can be displayed on the camera enabled mobile device 100, display 112.

The camera 106 can also acquire, visually, within the physical space 502 an augmented reality target 602. Such acquisition, visually, of the augmented reality target 602 can initiate or otherwise trigger an immersive user software event on the camera enabled mobile device 100. The camera enabled mobile device 100, absent suitable augmented reality renderings stored locally, on the camera enabled mobile device 100, can initiate a data communication over a global network 200, such as the Internet, by way of data communication interface 108, with remote data processing resources 206 associated with a remote agent 802.

The remote agent 802, using data processing resource 206, can collaborate with consumer 302, even appearing as remote agent 802, displayed on display 112, as a icon, audio and/or video image, or otherwise, as may be required and/or desired in a particular embodiment. Such remote agent 802 and consumer 302 collaborations can include the remote agent 802 selecting at least one of an augmented reality rendering 702 from a library of augmented reality renderings.

A data processing resource 202, operationally related to a database 204, can store and make accessible over a global network 200 augmented reality renderings, such as augmented reality rendering 702. Such a data processing resource 206 can be a laptop, personal computer, mobile digital device including a tablet or smart phone, or other types or kinds of data processing resources, as may be required and/or desired in a particular embodiment. Such a data processing resource 202 can be a server, network storage device, or other types or kinds of data process resources, as may be required and/or desired in a particular embodiment.

The remote agent 802 selected augmented reality rendering 702 can then be data communicated to the consumer 302, camera enabled mobile device 100. Combining the physical space imagery 506 with the augmented reality rendering 702 forms the immersive augmented reality experience, viewable on display 112 and usable through user interface 116, by the consumer 302, on the camera enabled mobile device 100.

Also illustrated are a physical object 504 and a graphical representation of the physical object 504 shown on a display 112.

Use of the term "immersive augmented reality experience", in the present invention, is intended to mean a software program, software application, or remote data processing resource 202 accessible software also referred to as a cloud solution or software as a service (SaaS) solution that is usable by a user 302. Such a software application can be downloaded or otherwise transferred onto the camera enabled mobile device 100 and encoded in the microprocessor readable memory 104. In general, such immersive augmented reality experience can be triggered, woken up, started, or otherwise initiated when processing of a camera 106 image recognizes an augmented reality target 604. Such triggering can cause the immersive user software events to initiate or otherwise load and begin microprocessor execution of instructions. In an exemplary embodiment, an immersive augmented reality experience is formed by bringing together at least one of physical space imagery 506 with at least one of an augmented reality rendering 702.

Use of the term "augmented reality target" or "augmented reality target 602", in the present invention, is intended to mean a unique graphical representation embodied on paper 604, other medium, or embodied as a shape recognizable within the physical location 502, also referred to as an invisible marker or markerless, augmented reality target, that can be relied on for initiating the immersive user software events when processing of a camera 106 image recognizes an augmented reality target 602. In general, such invisible or markerless tracking utilizes unique graphical representations embodied as a shape recognizable within the physical location 502. Such invisible or markerless augmented reality targets commonly utilize techniques of finding small unique features on the surface of objects and saving a three dimensional (3D) pattern of those features.

An advantage, in the present invention, of the augmented reality target 602 can be that when the camera enabled mobile device acquires the target that a plurality of 3D mapping characteristics based on imaging of the augmented reality target 602 can be computed. Such computed 3D characteristics can then be utilized to translate the visualization perspective of the augmented reality rendering 702, as to appear in context and perspective of the physical space imagery 506. This effectuates the ability to display the augmented reality rendering 702 in a manner, shape, size, visual perspective, etc., that makes the augmented reality rendering 702 appear naturally placed within the physical space imagery 506. The 3D mapping characteristics can be applied to multiple augmented reality renderings 702 and as the remote agent 802 selects and data communicates the augmented reality renderings 702, each can be translated and placed in context with the physical space imagery 506.

In an exemplary embodiment, recognition of an augmented reality target 602 causes initiation of an immersive user software event. Such event can connect the consumer 302 with the remote agent 802, so they can both data communicates or otherwise collaborate. The remote agent 802 can be human or virtual, software originating and controlled, and through interaction with the consumer 302 decide which augmented reality renderings from a library of augmented reality renderings to select and share or otherwise data communicate to the consumer's 302, camera enabled mobile device 100.

Once received an immersive augmented reality experience is formed by combining the physical space imagery 506 with the received augmented reality rendering 702. The consumer 302 can then be engendered to interact with the immersive augmented reality experience and selectively adjust at least one of an experience parameter.

In an exemplary embodiment, experience parameters can be accessed by way of the consumer 302 touching a button 608 or by touching the touch screen 110, and/or utilizing the arrow slider 606 to access options and manipulate the images being visualized on display 112. In general, the consumer can use user interface 116 to interact with the immersive augmented reality experience.

In an exemplary embodiment, an experience parameter can be color changing attributes of the displayed augmented reality rendering 702. Such color change ability enables the consumer 302 to view the augmented reality rendering 702, in different colors and view graphically what the rendering represents, such as an appliance, would appear in the context of the physical space 502, through viewing physical space imagery 506.

In another exemplary embodiment, as example and not a limitation, the experience parameter can be utilized to graphically add other products to the augmented reality rendering 702, as to allow the consumer 302 to visualize how other products might look through graphical representation of what the augmented reality rendering 702 represents. Such features can be expanded to include placing consumer products on virtual store shelves, tools or supplies on virtual shelves, and other types and/or kinds of visualizations, as may be required and/or desired in a particular embodiment.

In another exemplary embodiment, the experience parameters can include taking a picture/images of what is being displayed on the camera enabled mobile device 100, emailing or otherwise data communicating the picture/images, voice, text, or other data, collectively referred to as experience data 610, to a remote data processing resources, such as remote data processing resources 202 or 206.

Other experience parameters can include changing the language utilized in the immersive augmented reality experience to engage the consumer 302 in a familiar language, configuring geo-location parameters, engaging in a remote agent 802 assisted session, authorizing access control of the camera enabled mobile device 100 to the remote agent 802, and/or configuring other types and/or kinds of experience parameters, as may be required and/or desired in a particular embodiment.

In another exemplary embodiment, the experience parameters can include arrow slider 606, which can be utilized to allow the consumer 302 to slidably position and reaffix the augmented reality rendering 702 on the display 112, in a manner, as to allow the consumer 302 to graphically reposition the augmented reality appliance image 702 within the physical location imagery 506. This could also be possible in a 'frozen' version of the experience where the image stays the same but the consumer can move the item and/or make other experience changes. In such frozen versions, freezing the live streaming video feed from the camera enabled mobile device 100, enables the consumer 302 can interact with the immersive augmented reality experience without the need to position the camera enabled mobile device 100 at desired viewable subject matter.

In an exemplary embodiment, once the augmented reality target 602 is acquired by the camera 106 and the augmented reality rendering 702 is placed on the display 112, the augmented reality rendering 702 may initially be positioned in what might appears to be a random location. Though not random, the augmented reality rendering 702 is place in relationship to the augmented reality target 602 and thus may not appear in the desired location on display 112.

To correct the location of the augmented reality rendering 702, arrow slider 606 can be touched in the appropriate direction to nudge the augmented reality appliance image 602 into the correct location, within the physical location imagery 506, on display 112. The augmented reality rendering 702 can be repositioned and reaffixed to a new location.

The consumer 302 can then move the camera enabled mobile device 100 around, while viewing the augmented reality rendering 702, as to inspect and more intricately view the augmented reality rendering 702, even zooming 'In' and 'Out' by moving closer and further from the augmented reality rendering 702, as may be required and/or desired in a particular embodiment.

In other exemplary embodiments, the consumer 302 can in combination with changing colors, aesthetic features, languages, taking pictures/images, data communicating remotely, communicating with a remote agent 802, and exploiting other experience parameters, create a custom experience and use such experience to promote sale, service, and other activities with customers, as may be required and/or desired in a particular embodiment.

In addition, the consumer 302 in collaboration with the remote agent 802 can adjust experience parameters to change the type of augmented reality rendering 702 graphically represented. In this regard, there may be a group of augmented reality renderings 702 of appliances, for example and not a limitation a small, medium, and large version of the appliances or model versions for one country and different versions for another country in a library that the consumer 302 may want to experiment with visualizing and changing experience parameters. As such, remote agent 802 can select other augmented reality renderings 702 that the consumer 302 can then change the experience parameters with, such as touching a selection button 114, or touching the touch screen 110 to step through and display different augmented reality renderings 702 of different model types.

In an exemplary embodiment, the physical space imagery 506 can be generated by a video recording, streaming a live video, or by other generating techniques, as may be required and/or desired in a particular embodiment. Such video recording can allow the consumer 302, as well as, the remote agent 802 to replay the session and continue to add or change the augmented reality renderings 702, while the video recording of the physical space 506 remains unchanged and played in a loop if desired. In a streaming live video, such video stream can be consumer 302 generated with camera enabled mobile device 100 or remote agent 802 generated and data communicated to the consumer's 302, camera enabled mobile device 100.

Alternatively, the live streaming video or the video recording can be generated remotely and sent to either or both the remote agent 802 and the consumer 302, camera enabled mobile device 100. In such exemplary embodiment, for example and not a limitation, a video recording of physical space imagery 506 can be the inside of a home for sale and the remote agent 802 can collaborate with the consumer 302, by way of, the camera enabled mobile device 100 to show the home and add augmented reality renderings 702, such as furnishing to help the consumer visualize the possibilities.

In another exemplary embodiment, for example and not a limitation, a consumer 302 can broadcast a live streaming video from the camera enabled mobile device 100 to a car sales dealership. The remote agent 802 could add augmented reality renderings 702 of different types and models of cars to the live video stream. The live video stream physical space imagery 506 could be the consumer's 302 driveway located at the consumer's 302 home and the augmented reality renderings 702 could be rendered cars that the agent 802 has placed on the consumer's 302, physical space imagery 506, driveway, so that the consumer 302 can envision what the car would look like in their driveway. The consumer 302 could change experience parameters to view different options and variations of the cars, as may be required and/or desired in a particular embodiment.

Figure 2:
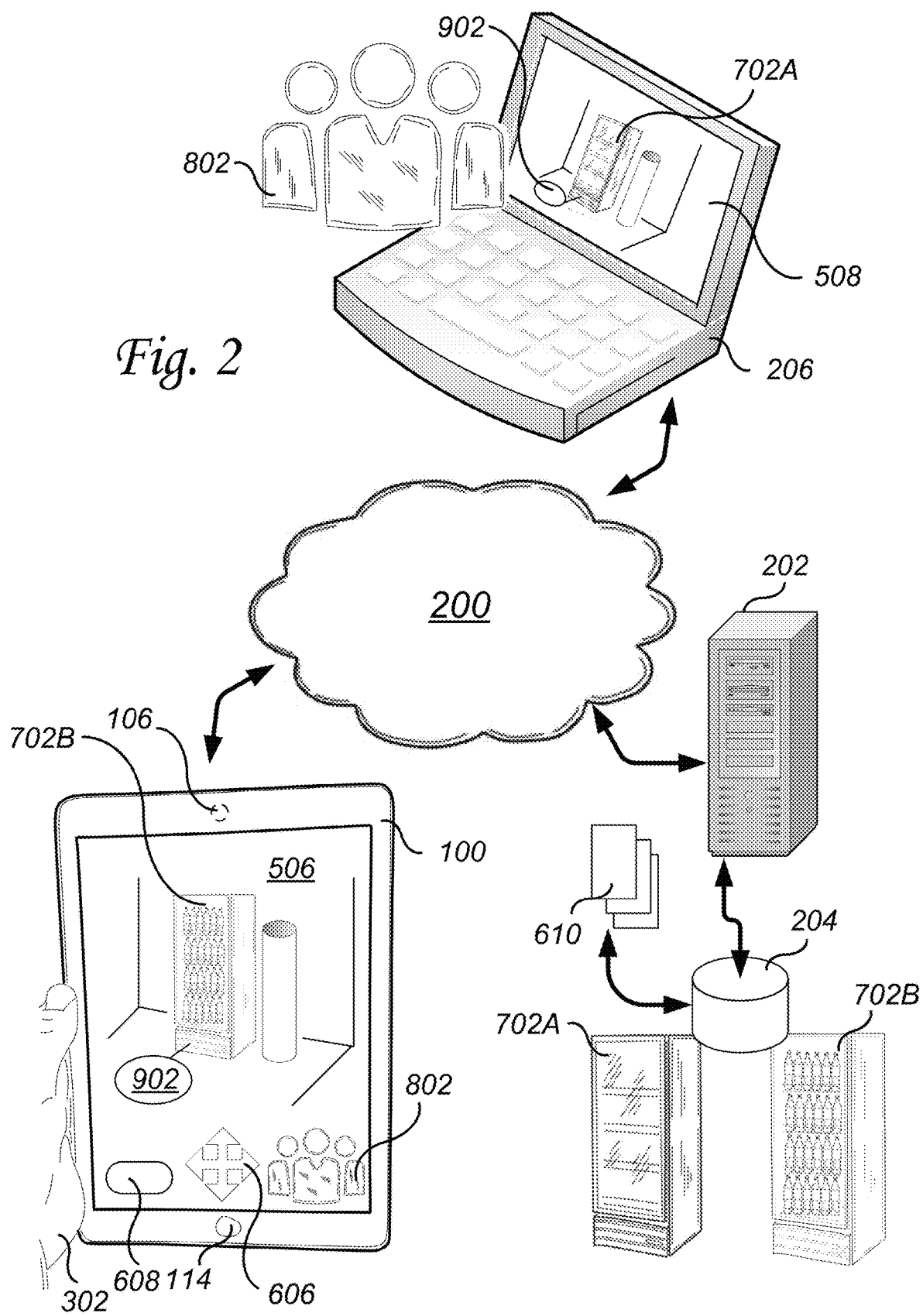
FIG. 2 illustrates one example of a global network diagram for placing augmented reality renderings, within the context of physical space imagery, creating an immersive augmented reality experience for a consumer.

Referring to FIG. 2, there is illustrated a global network 200 diagram for placing augmented reality renderings 702, within the context of physical space imagery 506, creating an immersive augmented reality experience for a consumer 302. Global network 200 can be the Internet. In an exemplary embodiment, each of a consumer 302 camera enabled mobile device 100, a remote agent 802 using a data processing device 206, and a global network 200 based data processing resource 202, with data storage 204 can be operationally networked together.

In operation, the consumer 302, by way of the camera enabled mobile device 100 can connect and collaborate with a remote agent 802 who is using a data process resource 206, the remote agent 802 deciding which augmented reality renderings 702 are right to show the consumer 302. In an exemplary embodiment, the consumer 302, by way of camera enabled mobile device 100, provides physical space imagery 506 and the remote agent 802 selects the augmented reality rendering 702A and/or 702B to share with the consumer 302. The augmented reality renderings 702A and 702B can be selected from a data global network 200 based data processing resource 202, data storage 204 location.

In an exemplary embodiment, optionally, the consumer 302 can share their physical space imagery 506 with the remote agent 802, illustrated as physical space imagery 508 on the remote agent's 802 data processing device 206. Additionally, as the consumer 302, by way of the camera enabled mobile device 100, is interacting with remote agent 802 selected augmented reality rendering 702B, the remote agent 802 can be viewing a different augmented reality rendering 702A on the remote agent's 802 data processing device 206. In this regard, the remote agent 802 can be previewing the next augmented reality rendering to share with the consumer 302.

In another exemplary embodiment, the remote agent 802 can animate the immersive augmented reality experience making the animation viewable by the consumer 302. In this regard, the remote agent 802 can take control of the immersive augmented reality experience and guide the consumer's 302 attention to certain aspects, visual location, or otherwise, as may be required and/or desired in a particular embodiment.

Furthermore, either the remote agent 802 or the consumer 302 can add annotations or other "floating" bubbles 902 type of notes and labels to the immersive augmented reality experience, which can be made viewable by both. As example and not a limitation, a floating label 902 can be positioned and affixed on the immersive augmented reality experience associated with augmented reality rendering 702. Whether the consumer 302 or the remote agent 802 places an artifact or label on the immersive augmented reality experience, it will appear on the others displayed view.

Use of the term "artifact", in the present invention, is intended to mean an object, such as a floating label, comment, graphic image, and other similar types and/or kinds of graphic representations that are positioned on the image being displayed.

Use of the term "floating label", in the present invention, is intended to mean a bubble or label that is attached by a lead-line to a reference point of a graphic image and the bubble or label portion is allowed to float off the periphery of the graphic image, out of the way of the main subject matter. In this regard, as the image perspective is changed, or the sizes of the image changes, the floating labels are automatically repositioned away from the main subject matter so that the consumer 302 view is not blocked.

In an exemplary embodiment, the immersive augmented reality experience can be saved on a remote data processing device, such as global network 200 based data processing resource 202 or 206, accessible by the consumer 302 and/or remote agent 802.

In another exemplary embodiment, the immersive augmented reality experience once formed through consumer 302 and remote agent 802 collaboration can be saved on a remote data processing device, such as global network 200 based data processing resource 202 or 206. In this example, the immersive augmented reality experience can comprise the physical space imagery 506 and the augmented reality renderings 702. In this regard, the immersive augmented reality experience is then viewable and useable, at any time, without the need to reimage the physical space 502 with a digital device, such as the camera enabled mobile device 100, or other digital devices, as may be required and/or desired in a particular embodiment.

In an alternative exemplary embodiment, the immersive augmented reality experience can be saved on a remote data processing device, such as global network 200 based data processing resource 202 or 206. The immersive augmented reality experience can comprise the augmented reality renderings 702. In this example, the consumer can access the immersive augmented reality experience and reimage the physical location 502 with the camera enabled mobile device 100, creating a second physical space imagery, in which to effectuating viewing and interaction with the augmented reality rendering in context of the second physical space imagery. Such can be an advantage, in the present invention, should the consumer 302, for example and not a limitation, want to see augmented reality renderings, such as furniture, at different times and in different rooms. In this case the second physical space imagery could be other rooms in the house.

Figure 3:
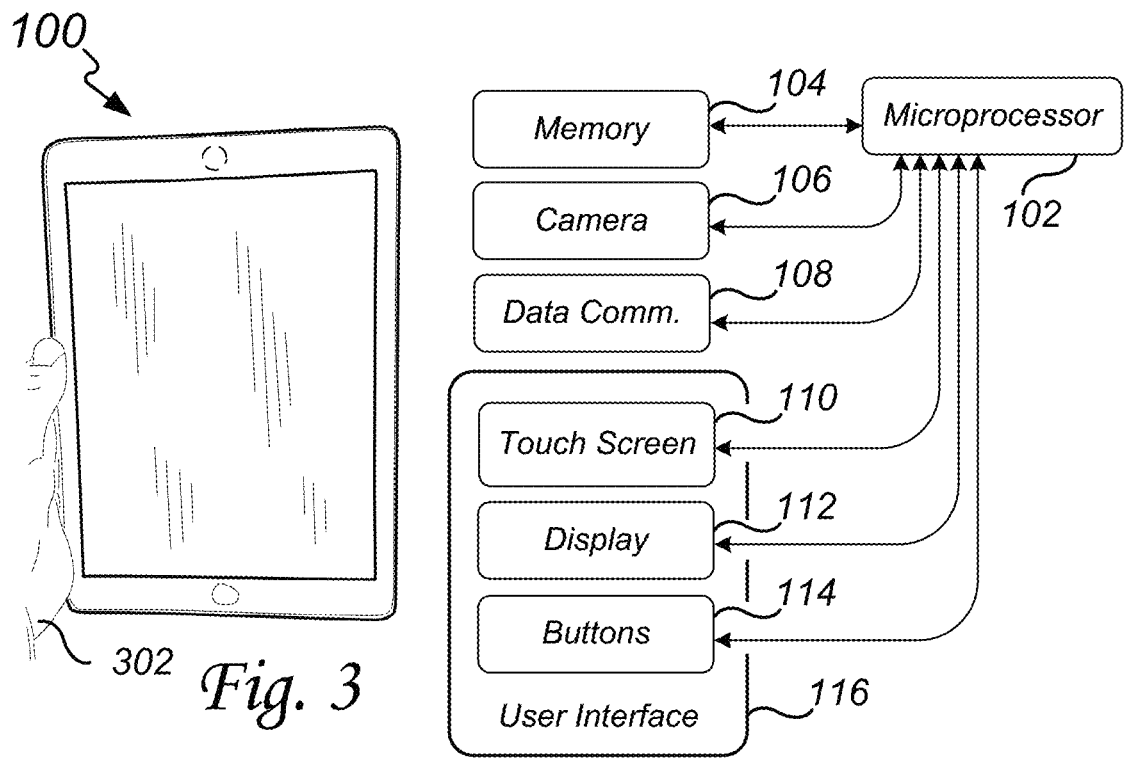
FIG. 3 illustrates one example of a system block diagram of a camera enabled mobile device.

Referring to FIG. 3, there is illustrated one example of a system block diagram of a camera enabled mobile device 100. In an exemplary embodiment, for example and not a limitation, the camera enabled mobile device 100 can be a smart phone, tablet computer, laptop computer, IPAD, IPHONE, ANDROID based phone, ANDROID based tablet computer, GOOGLE CHROME BOOK tablet computer, MICROSOFT SURFACE tablet computer, NOKIA/MICROSOFT smart phone, HTC smart phone, wearable devices, SAMSUNG smart phone or tablet computer, and/or other similar types and/or kinds of wireless phones, laptop computers, tablet computers, and/or camera enabled mobile devices, as may be required and/or desired in a particular embodiment.

In an exemplary embodiment, these camera enabled mobile devices 100 can comprise a microprocessor 102 and a microprocessor readable memory 104 operationally related to the microprocessor 102 so that the microprocessor readable memory 102 can be encoded with instructions that when executed perform the steps of the methods and exemplary embodiments of the present invention. In this regard, the immersive augmented reality experience, as a collection of instructions, can be encoded in the microprocessor readable memory 104 or otherwise be made available to the microprocessor 102 so that the microprocessor 102 can execute the instructions of the immersive augmented reality experience.

A camera 106, a data communication interface 108, a touch screen 110, a display 112, and at least one of a button 114 can each be operationally related to the microprocessor 102, so that a consumer 302 can utilize the camera enabled mobile device 100 as required and/or desired in a plurality of exemplary embodiments. Such features can be specified, procured, integrated into a design and manufactured into a working camera enabled mobile device 100 that is usable by user 302. For purposes of disclosure, touch screen 110, display 112, and buttons 114 can be referred to as user interface 116.

Such wireless communication interface can include BLUETOOTH, WI-FI, CELLULAR 3G, 4G, LTE and similar wireless network protocols, and/or other wireless communication interfaces, as may be required and/or desired in a particular embodiment.

Figure 4:
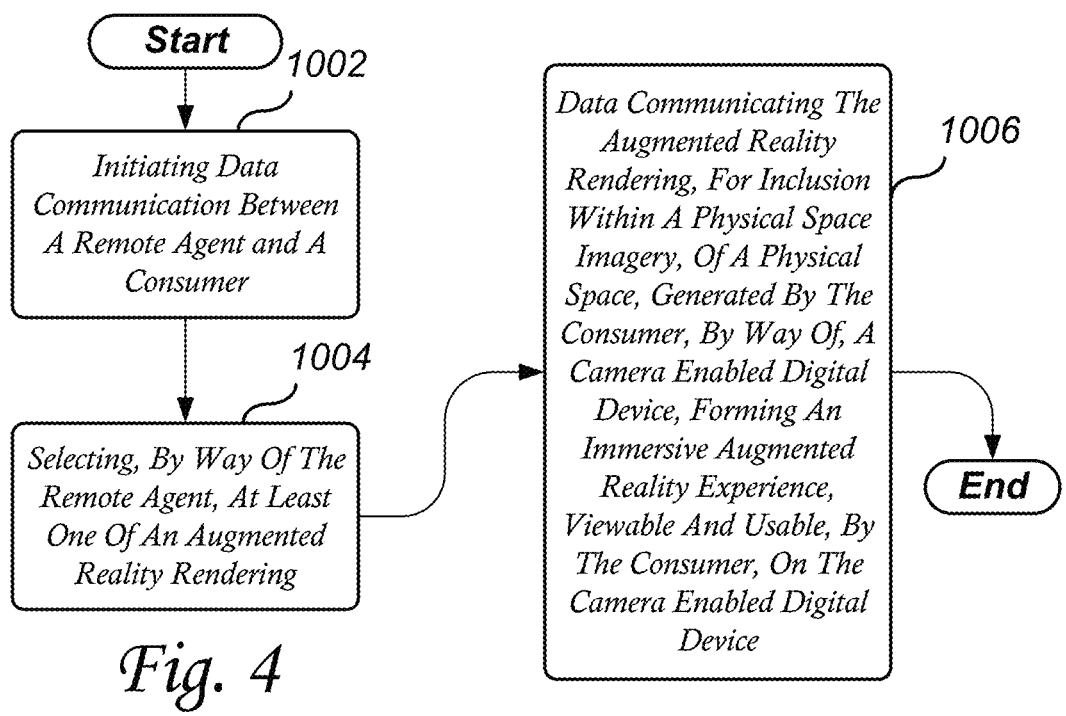
FIGS. 4 and 5 illustrates one example of a method of placing augmented reality renderings, within the context of physical space imagery, creating an immersive augmented reality experience.

Referring to FIG. 4, there is illustrated one example of a method of placing augmented reality renderings 702, within the context of physical space imagery 506, creating an immersive augmented reality experience. In an exemplary embodiment, a data communication can be initiated between a consumer 302 and a remote agent 802. Through collaboration, the remote agent 802 can select for the consumer 302 at least one of an augmented reality rendering 702. The selected augmented reality rendering 702 can be data communicated, for inclusion within physical space imagery 506, of a physical space 502, generated by the consumer 302, by way of, a camera enabled mobile device 100, forming an immersive augmented reality experience, viewable and useable, by the consumer, on the camera enabled mobile device 100. The method begins in block 1002.

In block 1002, a data communication can be initiated between a remote agent 802 and a consumer 302. In this regard, such initiation can be by triggering when an augmented reality target 602 is acquired or initiated by the consumer 302 in other ways such as logging into a website, requesting remote agent 802 interventions, or other ways, as may be required and/or desired in a particular embodiment. The method moves to block 1004.

In block 1004, the remote agent 802 can select at least one augmented reality rendering 702 to share with the consumer 302. Such remote agent 802 can be a human person or virtual software enabled agent and such selection can be based on the consumer's 302 expressed interests, needs, location, or otherwise, as may be required and/or desired in a particular embodiment. The method moves to block 1006.

In block 1006, the remote agent 802 selected augmented reality rendering 702 is then data communicated to the consumer 302, camera enabled mobile device 100, for inclusion within a physical space imagery 506, of a physical space 502, generated by the consumer 302, by way of, a camera enabled mobile device 100. In this regard, an immersive augmented reality experience is formed, viewable and useable, by the consumer 302, on the camera enabled mobile device 100. The method is the exited.

Figure 5:
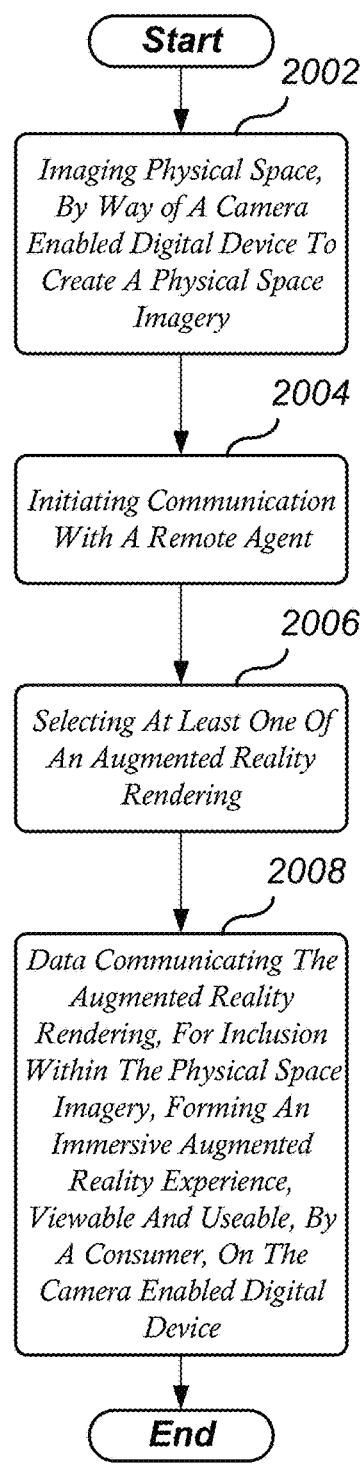

Referring to FIG. 5, there is illustrated one example of a method of placing augmented reality renderings 702, within the context of physical space imagery 506, creating an immersive augmented reality experience. In an exemplary embodiment, a physical space 502 can be imaged, by way of a camera enabled mobile device 100, to create physical space imagery 506. A data communication can be initiated between a consumer 302 and a remote agent 802. Through collaboration, the remote agent 802 can select for the consumer 302 at least one of an augmented reality rendering 702. The selected augmented reality rendering 702 can be data communicated, for inclusion within physical space imagery 506, of a physical space 502, generated by the consumer 302, by way of, a camera enabled mobile device 100, forming an immersive augmented reality experience, viewable and useable, by the consumer, on the camera enabled mobile device 100. The method begins in block 2002.

In block 2002, physical space 502 can be imaged, by way of camera enabled mobile device 100, to create physical space imagery 506. In an exemplary embodiment, such physical space imagery 506 can be created by way the consumer 302 holding or otherwise positioning their camera enabled mobile device 100, in a manner, to visually capture the physical space 502 they are interested in forming an immersive augmented reality experience to explore. The method moves to block 2004.

In block 2004, a data communication can be initiated with a remote agent 802. In this regard, such initiation can be by triggering when an augmented reality target 602 is acquired or initiated by the consumer 302 in other ways such as logging into a website, requesting remote agent 802 interventions, or otherwise, as may be required and/or desired in a particular embodiment. The method moves to block 2006.

In block 2006, the remote agent 802 can select at least one augmented reality rendering 702 to share with the consumer 302. Such remote agent 802 can be a human person or virtual software enabled agent and such selection can be based on the consumer's 302 expressed interests, needs, location, or otherwise, as may be required and/or desired in a particular embodiment. The method moves to block 2008.

In block 2008, the remote agent 802 selected augmented reality rendering 702 is then data communicated to the consumer 302, camera enabled mobile device 100, for inclusion within a physical space imagery 506, of a physical space 502, generated by the consumer 302, by way of, a camera enabled mobile device 100. In this regard, an immersive augmented reality experience is formed, viewable and useable, by the consumer 302, on the camera enabled mobile device 100. The method is the exited.

Figure 6:
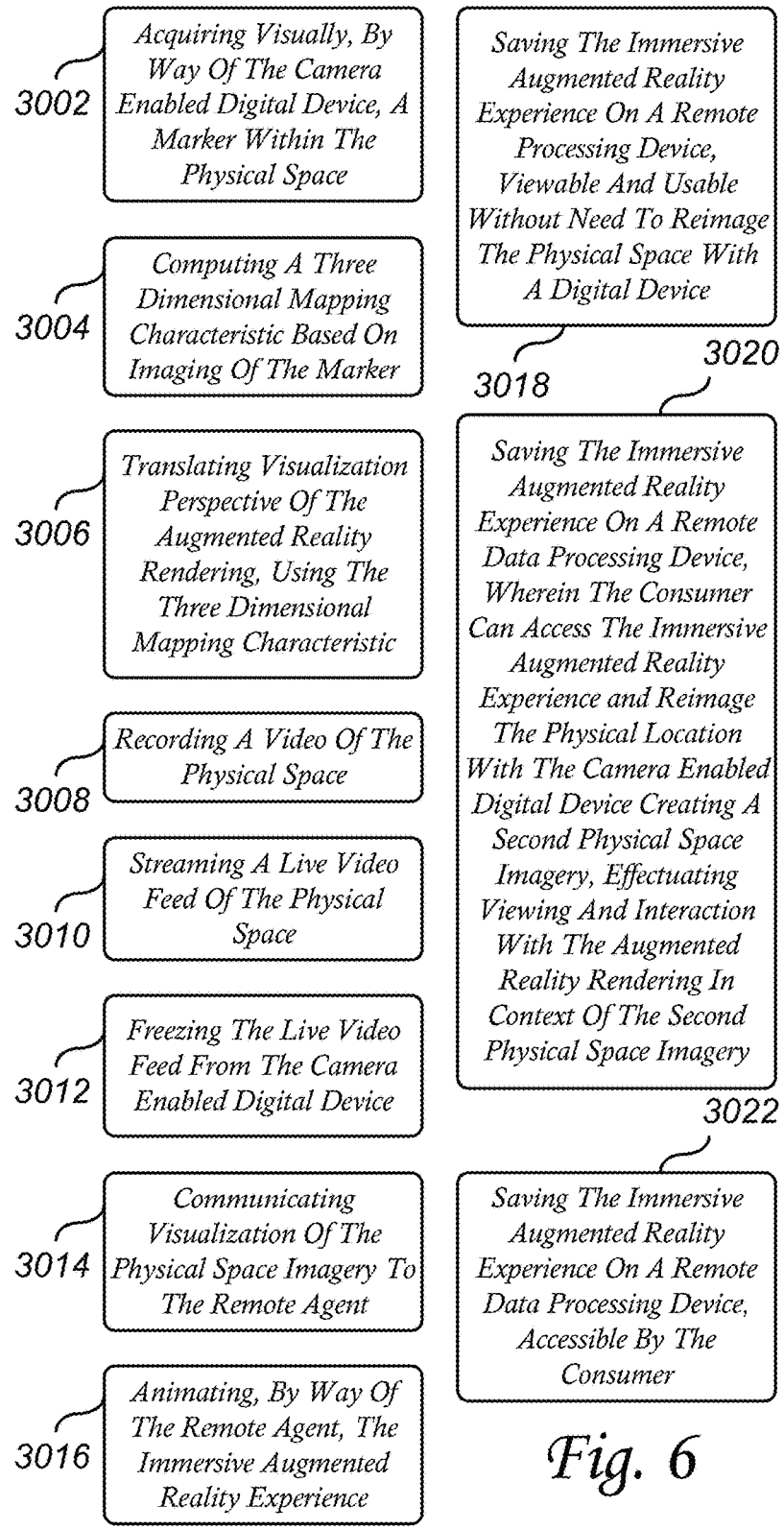
FIG. 6 illustrates exemplary embodiments of a method of placing augmented reality renderings, within the context of physical space imagery, creating an immersive augmented reality experience.

Referring to FIG. 6, there are illustrated exemplary embodiments of methods of placing augmented reality renderings 702, within the context of physical space imagery 506, creating an immersive augmented reality experience. Such exemplary embodiments can selectively be utilized with the methods of the present invention, as may be required and/or desired in a particular embodiment.

In block 3002, by way of the camera enabled mobile device, an augmented reality target 602 can be acquired, visually, within the physical space 502. Such augmented reality target 602 visual acquisition, by the camera enabled mobile device 100, can be utilized to trigger immersive user software events, including the methods of the present invention.

In block 3004, three dimensional mapping characteristic can be computed based on imaging of the augmented reality target 602.

In block 3006, the visualization perspective of the augmented reality rendering 702 can be translated, using the three dimensional mapping characteristic, as to appear in context and perspective of the physical space imagery 506.

An advantage in at least block 3004 and 3006, in the present invention, can be that when the camera enabled mobile device 100 acquires the augmented reality target 602, that a plurality of 3D mapping characteristics based on imaging of the augmented reality target 602 can be computed. Such computed 3D characteristics can then be utilized to translate the visualization perspective of the augmented reality rendering 702, as to appear in context and perspective of the physical space imagery 506. This effectuates the ability to display the augmented reality rendering 702 in a manner, shape, size, visual perspective, etc., that makes the augmented reality rendering 702 appear naturally placed within the physical space imagery 506. The 3D mapping characteristics can be applied to multiple augmented reality renderings 702 and as the remote agent 802 selects and data communicates additional and alternative augmented reality renderings 702, each can be translated and placed in context with the physical space imagery 506.

In block 3008, a video of the physical space 502 can be recorded.

In block 3010, a live video feed can be streamed of the physical space 502.

In an exemplary embodiment of at least block 3008 and 3010, the physical space imagery 506 can be generated by a video recording, streaming of a live video, or by other generating techniques, as may be required and/or desired in a particular embodiment. Such video recording can allow the consumer 302, as well as, the remote agent 802 to replay the session and continue to add or change the augmented reality renderings 702 while the video recording of the physical space 506 remains unchanged and played in a loop if desired. In a streaming live video, such video stream can be consumer 302 generated with camera enabled mobile device 100 or remote agent 802 generated and data communicated to the consumer's 302, camera enabled mobile device 100.

Alternatively, the live streaming video or the video recording can be generated remotely and sent to either or both the remote agent 802 and the consumer 302, camera enabled mobile device 100. In such exemplary embodiment, for example and not a limitation, a video recording of physical space imagery 506 can be the inside of a home for sale and the remote agent 802 can collaborate with the consumer 302, by way of, the camera enabled mobile device 100 to show the home and add augmented reality renderings 702.

In another exemplary embodiment, for example and not a limitation, a consumer 302 can broadcast a live streaming video from the camera enabled mobile device 100 to a car sales dealership. The remote agent 802 could add augmented reality renderings 702 of different types and models of cars to the live video stream. The live video stream physical space imagery 506 could be of a consumer's 302 driveway located at the consumer's 302 home and the augmented reality renderings 702 could be rendered cars that the agent 802 has placed on the consumer's 302, physical space imagery 506, driveway, so that the consumer 302 can envision what the car would look like in their driveway. The consumer 302 could change experience parameters to view different options and variations of the cars, as may be required and/or desired in a particular embodiment.

In block 3012, the live video feed from the camera enabled mobile device 100 can be frozen, wherein the consumer 302 can interact with the immersive augmented reality experience without the need to position the camera enabled mobile device 100 at desired viewable subject matter.

In an exemplary embodiment, the experience parameters can include arrow slider 606, which can be utilized to allow the consumer 302 to slidably position and reaffix the augmented reality rendering 702 on the display 112, in a manner, as to allow the consumer 302 to graphically reposition the augmented reality appliance image 702 within the physical location imagery 506. This could also be possible in a 'frozen' version of the experience, where the image stays the same but the consumer 302 can move the item and/or make other experience changes. In such a frozen version, freezing the live video feed from the camera enabled mobile device, enables the consumer 302 to be able to interact with the immersive augmented reality experience without the need to position the camera enabled mobile device 100 at desired viewable subject matter.

In block 3014, a visualization of the physical space imagery 506 can be data communicated to the remote agent 802.

In block 3016, the immersive augmented reality experience, by way of the remote agent 802, can be animated, wherein the animation is viewable by the consumer 302.

In operation with at least blocks 3014 and 3016, the consumer 302, by way of the camera enabled mobile device 100 can connect and collaborate with a remote agent 802 who is using a data process resource 206, the remote agent 802 deciding which augmented reality renderings 702 are right to show the consumer 302. In an exemplary embodiment the consumer 302, by way of camera enabled mobile device 100 provides physical space imagery 506 and the remote agent 802 selects the augmented reality rendering 702A and/or 702B to share with the consumer 302. The augmented reality renderings 702A and 702B can be selected from a data global network 200 based data processing resource 202, data storage 204 location.

In an exemplary embodiment, optionally, the consumer 302 can share their physical space imagery 506 with the remote agent 802, illustrated as physical space imagery 508. Additionally, as the consumer 302, by way of the camera enabled mobile device 100, is interacting with remote agent 802 selected augmented reality rendering 702B, the remote agent 802 can be viewing a different augmented reality rendering 702A on the remote agent's 802 data processing device 206. In this regard, the remote agent 802 can be previewing the next augmented reality rendering to share with the consumer 302.

In another exemplary embodiment, the remote agent 802 can animate the immersive augmented reality experience making the animation viewable by the consumer 302. In this regard, the remote agent 802 can take control of the immersive augmented reality experience and guide the consumer's 302 attention to certain aspects, visual location, or otherwise, as may be required and/or desired in a particular embodiment.

Furthermore, either the remote agent 802 or the consumer 302 can add annotations or other "floating" bubbles 902 type of notes and labels to the immersive augmented reality experience, which can be made viewable by both. As example and not a limitation, a floating label 902 can be positioned and affixed on the immersive augmented reality experience associated with augmented reality rendering 702. Whether the consumer 302 or the remote agent 802 places an artifact or label on the immersive augmented reality experience, it will appear on the others displayed view.

In block 3018, the immersive augmented reality experience can be saved on a remote data processing device, such a global network 200 based data processing resource 202 or 206. The immersive augmented reality experience can comprise the physical space imagery 506 and the augmented reality rendering 702, wherein the immersive augmented reality experience is viewable and useable without the need to reimage the physical space 502 with a digital device, such a digital device can be a camera enabled mobile device 100.

In block 3020, the immersive augmented reality experience can be saved on a remote data processing device, such as global network 200 based data processing resource 202 or 206. The immersive augmented reality experience can comprise the augmented reality rendering 702, wherein the consumer 302 can access the immersive augmented reality experience and reimage the physical location 502, with the camera enabled mobile device 100, creating a second physical space imagery 506, effectuating viewing and interaction with the augmented reality rendering 702 in context of the second physical space imagery.

In block 3022, the immersive augmented reality experience can be saved on a remote data processing device, such as global network 200 based data processing resource 202 or 206, accessible by the consumer.

Referring to FIG. 7, there is illustrated one example of a system and method of placing augmented reality renderings 702, within the context of physical space imagery 506, creating an immersive augmented reality experience. In an exemplary embodiment, a camera enabled mobile device 100 can comprise a microprocessor 102 and a microprocessor readable memory 104. The microprocessor readable memory 104 can be encoded with instructions that when executed perform the step of imaging a physical space 502 to create a physical space imagery 506. Additionally, instructions that when executed perform the steps of initiating data communications with a remote agent 802, receiving by data communication at least one augmented reality rendering 702 selected by the remote agent 802, and forming an immersive augmented reality experience by combining the physical space imagery 506 with the augmented reality rendering 702. The method begins in block 4002.

In block 4002, physical space 502 can be imaged, by way of camera enabled mobile device 100, to create physical space imagery 506. In an exemplary embodiment, such physical space imagery 506 can be created by way the consumer 302 holding or otherwise positioning their camera enabled mobile device 100 in a manner to visually capture the physical space 502 they are interested in forming an immersive augmented reality experience to explore. The method moves to block 4004.

In block 4004, a data communication can be initiated with a remote agent 802. In this regard, such initiation can be by triggering when an augmented reality target 602 is acquired or initiated by the consumer 302 in other ways such as logging into a website, requesting remote agent 802 interventions, or other ways, as may be required and/or desired in a particular embodiment. The method moves to block 4006.

In block 4006, by way of the data communication interface 108, from the remote data processing resource 202, at least one of an augmented reality rendering 702, selected by the remote agent 802, can be received by the camera enabled mobile device 100. The method moves to block 4008.

In block 4008, by inclusion of the augmented reality rendering 702, within the physical space imagery 506, an immersive augmented reality experience is formed, viewable and useable, by a consumer 302, on the camera enabled mobile device 100. The method is exited.

Referring to FIG. 8, there are illustrated exemplary embodiments of methods of placing augmented reality renderings 702, within the context of physical space imagery 506, creating an immersive augmented reality experience. Such exemplary embodiments can selectively be utilized with the methods of the present invention, as may be required and/or desired in a particular embodiment.

In block 5002, the immersive augmented reality experience can be saved on a remote data processing device, such as global network 200 based data processing resource 202 or 206, or on the camera enabled mobile device 100. The immersive augmented reality experience can comprise the physical space imagery 506 and the augmented reality rendering 702, wherein the immersive augmented reality experience is viewable and useable without the need to reimage the physical space 502 with a digital device, such as camera enabled mobile device 100.

In block 5004, the immersive augmented reality experience can be saved on a remote data processing device, such as global network 200 based data processing resource 202 or 206, or on the camera enabled mobile device 100. The immersive augmented reality experience can comprise the augmented reality rendering 702, wherein the consumer 302 can access the immersive augmented reality experience and reimage the physical location 502 with the camera enabled mobile device 100 creating a second physical space imagery, effectuating viewing and interaction with the augmented reality rendering 702 in context of the second physical space imagery.

In block 5006, the immersive augmented reality experience can be saved on a remote data processing device, such as global network 200 based data processing resource 202 or 206, or on the camera enabled mobile device 100, accessible by the consumer 302.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of placing augmented reality renderings, within context of physical space imagery, creating immersive augmented reality experiences, the method comprising the steps of:
   transitioning locally between:
      imaging, in real-time, a physical space, by way of a camera enabled mobile device, when a camera associated with the camera enabled mobile device visually acquires an augmented reality target, to create a physical space imagery and selectively initiate an immersive augmented reality experience; and
      freezing the physical space imagery, while allowing the consumer to interact with the augmented reality rendering, when the camera associated with the camera enabled mobile device points away from desired subject matter losing visual site of the augmented reality target, freezing of the physical space imagery occurring absent of intervention by the consumer, creating seamless local experience for a consumer interacting with the immersive augmented reality experience;
   initiating data communication between the remote agent and the consumer by way of the camera enabled mobile device;
   selecting at least one of an augmented reality rendering, the immersive augmented reality experience is inclusive of at least one of the augmented reality rendering selected by the remote agent who is human or virtual and configured to interact with the consumer operator of the camera enabled mobile device; and
   data communicating the augmented reality rendering, for inclusion within the physical space imagery, forming the immersive augmented reality experience, viewable and useable, by the consumer, on the camera enabled mobile device.

2. The method in accordance with claim 1, the step of imaging further comprising:
   acquiring visually, by way of the camera enabled mobile device, an augmented reality target within the physical space.

3. The method in accordance with claim 2, further comprising:
   computing a three dimensional mapping characteristic based on imaging of the augmented reality target.

4. The method in accordance with claim 3, further comprising:
   translating visualization perspective of the augmented reality rendering, using the three dimensional mapping characteristic, as to appear in context and perspective of the physical space imagery.

5. The method in accordance with claim 1, the step of imaging further comprising:
   recording a video of the physical space.

6. The method in accordance with claim 1, the step of imaging further comprising:
   streaming a live video feed of the physical space.

7. The method in accordance with claim 1, further comprising:
   communicating visualization of the physical space imagery to the remote agent.

8. The method in accordance with claim 1, further comprising:
   animating, by way of the remote agent, the immersive augmented reality experience, wherein the animation is viewable by the consumer.

9. The method in accordance with claim 1, further comprising:
   saving the immersive augmented reality experience on a remote data processing device, the immersive augmented reality experience further comprising the physical space imagery and the augmented reality rendering, wherein the immersive augmented reality experience is viewable and useable without need to reimage the physical space with a digital device.

10. The method in accordance with claim 1, further comprising:
    saving the immersive augmented reality experience on a remote data processing device, the immersive augmented reality experience further comprising the augmented reality rendering, wherein the consumer can access the immersive augmented reality experience and reimage the physical location, with the camera enabled mobile device, creating a second physical space imagery, effectuating viewing and interaction with the augmented reality rendering in context of the second physical space imagery.

11. The method in accordance with claim 1, further comprising:
    saving the immersive augmented reality experience on a remote data processing device, accessible by the consumer.

12. A system for placing augmented reality renderings, within context of physical space imagery, creating immersive augmented reality experiences, the system comprising:
    a camera enabled mobile device, the camera enabled mobile device further comprising:
       a camera;
       a display;
       a user interface;
       a data communication interface;
       a microprocessor readable memory; and
       a microprocessor, the camera, the display, the user interface, and the microprocessor readable memory are operationally coupled with the microprocessor, the microprocessor readable memory is encoded with instructions that when executed by the microprocessor, perform the steps of:
          transitioning locally between:
             imaging, in real-time, a physical space, by way of the camera when the camera visually acquires an augmented reality target, to create a physical space imagery and selectively initiate an immersive augmented reality experience; and
             freezing the physical space imagery, while allowing the consumer to interact with the augmented reality rendering, when the camera associated with the camera enabled mobile device points away from desired subject matter losing visual site of the augmented reality target, freezing of the physical space imagery occurring absent of intervention by the consumer, creating seamless local experience for a consumer interacting with the immersive augmented reality experience;

initiating data communication, by way of the data communication interface, with a remote agent;

receiving, by way of the data communication interface, from a remote data processing resource, at least one of the augmented reality rendering, the immersive augmented reality experience is inclusive of at least one of the augmented reality rendering selected by the remote agent who is human or virtual and configured to interact with the consumer operator of the camera enabled mobile device; and forming by inclusion of the augmented reality rendering, within the physical space imagery, the immersive augmented reality experience, viewable and useable, by the consumer, on the camera enabled mobile device.

13. The system in accordance with claim 12, the step of imaging further comprising:

acquiring visually, by way of the camera enabled mobile device, an augmented reality target within the physical space.

14. The system in accordance with claim 13, further comprising:

computing a three dimensional mapping characteristic based on imagery of the augmented reality target.

15. The system in accordance with claim 14, further comprising:

translating visualization perspective of the augmented reality rendering, using the three dimensional mapping characteristic, as to appear in context and perspective of the physical space imagery.

16. The system in accordance with claim 12, further comprising:

saving the immersive augmented reality experience on a remote data processing device or the camera enabled mobile device, the immersive augmented reality experience further comprising the physical space imagery and the augmented reality rendering, wherein the immersive augmented reality experience is viewable and useable without need to reimage the physical space with a digital device.

17. The system in accordance with claim 12, further comprising:

saving the immersive augmented reality experience on a remote data processing device or the camera enabled mobile device, the immersive augmented reality experience further comprising the augmented reality rendering, wherein the consumer can access the immersive augmented reality experience and reimage the physical location, with the camera enabled mobile device, creating a second physical space imagery, effectuating viewing and interaction with the augmented reality rendering in context of the second physical space imagery.

18. The system in accordance with claim 12, further comprising:

saving the immersive augmented reality experience on a remote data processing device or the camera enabled mobile device, accessible by the consumer.

19. A method of placing augmented reality renderings, within context of physical space imagery, creating immersive augmented reality experiences, the method comprising the steps of:

initiating data communication between a remote agent and a consumer;

selecting at least one of an augmented reality rendering, an immersive augmented reality experience is inclusive of at least one of the augmented reality rendering selected by the remote agent who is human or virtual and configured to interact with the consumer operator of the camera enabled mobile device;

data communicating the augmented reality rendering, for inclusion within a physical space imagery, of a physical space, generated in real-time by the consumer, by way of, a camera enabled mobile device, forming the immersive augmented reality experience, viewable and useable, by the consumer, on the camera enabled mobile device; and transitioning locally between:

viewing the physical space with the immersive augmented reality experience when the camera associated with the camera enabled mobile device is pointed at the physical space and visually acquires an augmented reality target; and freezing the physical space imagery, of the physical space, while allowing the consumer to interact with the augmented reality rendering, when the camera associated with the camera enabled mobile device points away from desired subject matter losing visual site of the augmented reality target, freezing of the physical space imagery occurring absent of intervention by the consumer, creating seamless local experience for the consumer interacting with the immersive augmented reality experience.

20. The method in accordance with claim 19, further comprising:

receiving data communication, at the remote agent, of visualization of the physical space imagery generate by the consumer.

21. The method in accordance with claim 19, further comprising:

animating, at the remote agent, the immersive augmented reality experience, wherein the animation is viewable by the consumer.

22. The method in accordance with claim 19, further comprising:

saving the immersive augmented reality experience on a remote data processing device, the immersive augmented reality experience further comprising the physical space imagery and the augmented reality rendering, wherein the immersive augmented reality experience is viewable and useable without need to reimage the physical space with a digital device.

23. The method in accordance with claim 19, further comprising:

saving the immersive augmented reality experience on a remote data processing device, the immersive augmented reality experience further comprising the augmented reality rendering, wherein the consumer can access the immersive augmented reality experience and reimage the physical location, with the camera enabled mobile device, creating a second physical space imagery, effectuating viewing and interaction with the augmented reality rendering in context of the second physical space imagery.

24. The method in accordance with claim 19, further comprising:

saving the immersive augmented reality experience on a remote data processing device, accessible by the consumer.

\* \* \* \* \*